US011195051B2

(12) United States Patent
Huang et al.

(10) Patent No.: US 11,195,051 B2
(45) Date of Patent: Dec. 7, 2021

(54) METHOD FOR PERSON RE-IDENTIFICATION BASED ON DEEP MODEL WITH MULTI-LOSS FUSION TRAINING STRATEGY

(71) Applicants: Tongji University, Shanghai (CN); Hefei University of Technology, Hefei (CN); Beijing E-Hualu Info Technology Co., Ltd., Beijing (CN)

(72) Inventors: Deshuang Huang, Shanghai (CN); Sijia Zheng, Shanghai (CN); Zhongqiu Zhao, Hefei (CN); Xinyong Zhao, Beijing (CN); Jianhong Sun, Beijing (CN); Yang Zhao, Beijing (CN); Yongjun Lin, Beijing (CN)

(73) Assignees: Tongji University, Shanghai (CN); Hefei University of Technology, Hefei (CN); Beijing E-Hualu Info Technology Co., Ltd., Beijing (CN)

( * ) Notice: Subject to any disclaimer, the term of this patent is extended or adjusted under 35 U.S.C. 154(b) by 16 days.

(21) Appl. No.: 16/813,001

(22) Filed: Mar. 9, 2020

(65) Prior Publication Data
US 2020/0285896 A1 Sep. 10, 2020

(30) Foreign Application Priority Data
Mar. 9, 2019 (CN) .......................... 201910177443.0

(51) Int. Cl.
*G06K 9/62* (2006.01)
*G06N 20/00* (2019.01)
*G06K 9/00* (2006.01)
*G06K 9/46* (2006.01)
*G06T 3/60* (2006.01)
*G06T 5/00* (2006.01)

(52) U.S. Cl.
CPC ....... *G06K 9/6256* (2013.01); *G06K 9/00369* (2013.01); *G06K 9/00771* (2013.01); *G06K 9/46* (2013.01); *G06N 20/00* (2019.01); *G06T 3/60* (2013.01); *G06T 5/002* (2013.01)

(58) Field of Classification Search
None
See application file for complete search history.

(56) References Cited

U.S. PATENT DOCUMENTS

2020/0097742 A1* 3/2020 Kumar ................. G06N 3/0454
2020/0226421 A1* 7/2020 Almazan ............... G06N 3/084

* cited by examiner

*Primary Examiner* — Leon Flores
(74) *Attorney, Agent, or Firm* — Troutman Pepper Hamilton Sanders LLP; Christopher C. Close, Jr.

(57) ABSTRACT

The invention relates to a method for person re-identification based on deep model with multi-loss fusion training strategy. The method uses a deep learning technology to perform preprocessing operations such as flipping, clipping, random erasing and style transfer, and then feature extraction is performed through a backbone network model; joint training of a network is performed by fusing a plurality of loss functions. Compared with other deep learning-based person re-identification algorithms, the present invention greatly improves the performance of person re-identification by adopting a plurality of preprocessing modes, the fusion of three loss functions and effective training strategy.

9 Claims, 3 Drawing Sheets

METHOD FOR PERSON RE-IDENTIFICATION BASED ON DEEP MODEL WITH MULTI-LOSS FUSION TRAINING STRATEGY

TECHNICAL FIELD

The present invention relates to the field of computer vision, and in particular, to a method for person re-identification based on deep model with multi-loss fusion training strategy.

BACKGROUND

The basic task of distributed multi-camera surveillance system is to associate people with camera views at different locations and times, which is called person re-identification. More specifically, person re-identification is mainly to solve the problem of "where did the target person appear before" or "where did the target person go after being captured in the monitoring network". It supports many key applications, such as long-time multi-camera tracking and forensics search. In fact, each camera can take photos from different angles and distances under changing lighting conditions, occlusion, different static and dynamic backgrounds. These problems pose great challenges for person re-identification task. At the same time, since the restrictions such as crowded background and low resolution on persons observed by cameras at unknown distances, person re-identification techniques that rely on traditional biometrics such as face recognition are neither feasible nor reliable.

The traditional person re-identification techniques are mainly divided into two aspects: feature representations and distance metric learning. The commonly used features include color features, texture features, shape features, as well as higher-level attribute features, behavioral semantic features, etc. Euclidean distance was used first in the distance metric learning, and then some supervised similarity discriminatory methods were also proposed one after another.

With the development of deep learning technology, the methods based on deep learning models are most commonly used in the field of person re-identification. At present, deep models for person re-identification can be divided into three types: Identification model, Verification model and Triplet model. The identification model is the same as a classification model on other tasks in computer vision. Given an image and then outputting the label, the model can make full use of labeling information of a single image. The verification model takes two images as inputs and determines whether the two inputs are the same person. The verification model uses weak labels (the relationship between two persons) instead of labeling information of a single image. Similarly, the triplet model takes three images as inputs to shorten the intra-class distance and increase the inter-class distance instead of labeling information of a single image. In addition, related works show that there is still a relatively large intra-class distance in the triplet loss training network. Under the above background, it is particularly important to develop a person re-identification technology based on a deep model with multi-loss fusion training strategy by making full use of the advantages of each loss.

SUMMARY

The present invention provides a method for person re-identification based on deep model with multi-loss fusion training strategy to overcome the shortcomings in the prior art.

The objective of the invention can be achieved by the following technical solutions:

Step 1: Acquiring an original image data set, and dividing the dataset into a training set and a test set.

Step 2: Performing data preprocessing and data augmentation on the training set. The embodiments of the present invention adopt the following data processing modes:

1) randomly extracting a plurality of images in the benchmark data set for horizontal flipping;
2) randomly extracting a plurality of images in the benchmark data set and performing Gaussian and salt-pepper noise processing;
3) randomly extracting a plurality of images in the benchmark data set for erasing of a random size of a random area;
4) using a cycle generative adversarial network (GAN) to perform style transfer of the same person image taken by different cameras in the same data set, which reduces the environmental difference between different camera visions. Preferably, the data is augmented using the cycle GAN.

Step 3: Selecting and training the benchmark network, updating the weight, optimizing the network, and adjusting hyper-parameters of the benchmark network.

Preferably, for a person re-identification dataset with a large number of data, a transfer learning strategy is used, for example, on the Market1501 and CUHK03 datasets, the model parameters pre-trained on ImageNet are used for initialization and further training. For small person datasets, training is performed in a fine adjustment mode on the model trained on the large data to make up for the shortcomings of few data sets.

For the network training, joint limit is performed by fusing triplet loss function, cross-entropy loss function and center loss function. A triplet model is used as a skeleton, so the number of input images is three, and the expression of the group of input images is:

$$R_i = <R_i^o, R_i^+, R_i^->$$

where $R_i^o$ and $R_i^+$ represent the positive sample pairs, respectively, and $R_i^o$ and $R_i^-$ represent the negative sample pairs, respectively.

The overall model includes three pre-trained convolutional neural network (CNN) structures, which have identical network structures and share weights. The feature maps are obtained through a feature extraction layer, then network training is performed through a fusion loss, and the weight is updated.

1) The cross-entropy loss function is the same as the loss function used for general classification tasks. The corresponding formula is as follows:

$$L_1 = -\frac{1}{m}\sum_{i=1}^{m}\log\frac{e^{W_{y_i}^T x_i + b_{y_i}}}{\sum_{j=1}^{n} e^{W_j^T x_i + b_j}}$$

where i is a sample, $x_i$ is a feature class, m represents a sample batch size, n represents the number of person IDs, $b_j$ is a j-th offset value, $y_i$ is the label information of an input i-th sample, and $W_i$ is an i-th column of a feature layer parameter matrix W of the feature layer 2) To increase an inter-class distance and shorten an intra-class distance, the triplet loss function is used to force the inter-class distance to be smaller than the intra-class distance. Euclidean distance is used in the distance metric learning. The corresponding loss function formula is as follows:

$$L_2=[\text{thre}+d(F_w(R_i^o),F_w(R_i^+))-d(F_w(R_i^o),F_w(R_i^-))]_+$$

where thre is a hyper-parameter used to make a distance between sample pairs of the same class smaller than a distance between sample pairs of different classes. $d(.)$ represents the distance measurement function, $F_w(R_i^o)$, $F_w(R_i^+)$ and $F_w(R_i^-)$ are the feature maps corresponding to $R_i^o$, $R_i^+$ and $R_i^-$ respectively, and $[x]_+$ is a function max $(0,x)$.

3) The foregoing two loss functions can ensure that the inter-class distance is effectively increased. However, some studies have shown that the distance between sample pairs of the same class is still large when the previous two losses trained and the intra-class distance are not well controlled. In view of this situation, the center loss function is used to combine the previous two losses. The main objective of the center loss function is to make feature maps of the same ID close to the center. At the same time, the center is continuously updated during the network training. The corresponding formula is as follows:

$$L_3 = \frac{1}{2m}\sum_{i=1}^{m} \|x_i - center_{y_i}\|_2^2$$

where $center_{yi}$ is a center point of a feature with an $x_i$ class being $y_i$.

In the training process, the center is continuously updated, and when $s=y_i$ the updating formula is as follows:

$$\Delta(center)_s^t = \frac{\sum_{i=1}^{m} center_s - x_i}{m+1}$$

$$center_s^{t+1} = center_j^t - \lambda \Box \Delta center_s^t$$

where $\lambda$ is the learning rate of the center loss function.

The network model is jointly trained by using the triplet loss, the cross-entropy loss and the center loss. The fused loss function is expressed as follows:

$$L=\alpha_1 L_1+\alpha_2 L_2+\alpha_3 L_3$$

where $\alpha_1$ is the weight of the proportion of the cross-entropy loss, $\alpha_2$ is the weight of the proportion of the triplet loss, and $\alpha_3$ is the weight of the proportion of the center loss. The weights, $\alpha_1$, $\alpha_2$ and $\alpha_3$, of the loss functions may be preferably 0.69, 0.23 and 0.01, respectively.

4) The adjusting hyper-parameters of the backbone network includes iteration step adjustment, initial value adjustment of iteration step, and selection of learning function. Preferably, the training epoch is set to 150, the weight decay parameter is 0.0005, the batch size is 180, and the learning rate update mode is as follows:

$$lr = \begin{cases} 0.0002 \text{ if epoch} \leq 100 \\ 0.0002 \times (0.001^{((epoch-100)/50.0)}) \end{cases}$$

Step 4: After the data set is subjected to the corresponding organization and the foregoing data augmentation, inputting the image into the CNN for feature extraction. The expression of the respective feature maps $F_w(R_i)$ obtained through the reference CNN is as follows:

$$F_w(R_i)=<F_w(R_i^o),F_w(R_i^+),F_w(R_i^-)>$$

Step 5: The Euclidean distances are calculated for the extracted features in pairs, the calculated Euclidean distances are sorted, and an image closest to a target in the query set is selected from the gallery set as the identification result.

Compared with the prior art, the invention has the following advantages:

I. The method of the invention adopts a plurality of preprocessing modes, the fusion of three loss functions and effective training strategies, which greatly improves the performance of person re-identification.

II. According to the method of the invention, the images from training set are subjected to adding of different noises and horizontal flipping, and some images are extracted for automatic clipping and random erasing operations. On the one hand, the function of data augmentation can be realized; on the other hand, the occurrence of over-fitting can be avoided, a certain effect can be taken on data occlusion in real data, and the generalization capability of the model is improved.

III. The invention uses multiple losses for fusion and combines the advantages of three loss functions. In the training process, an intra-class distance is shortened while an inter-class distance is increased, the resulted features provided by the network are more effective.

IV. According to the method of the invention, in the model training process, for a person re-identification data set with a large amount of data, transfer learning is adopted to initialize pre-trained model parameters, and then training is further performed; and for a person data set with a small amount of data, training is performed in a fine adjustment mode on the model trained on the large data, which can make up for the defect of too few data sets.

DETAILED DESCRIPTION

Figure 1:
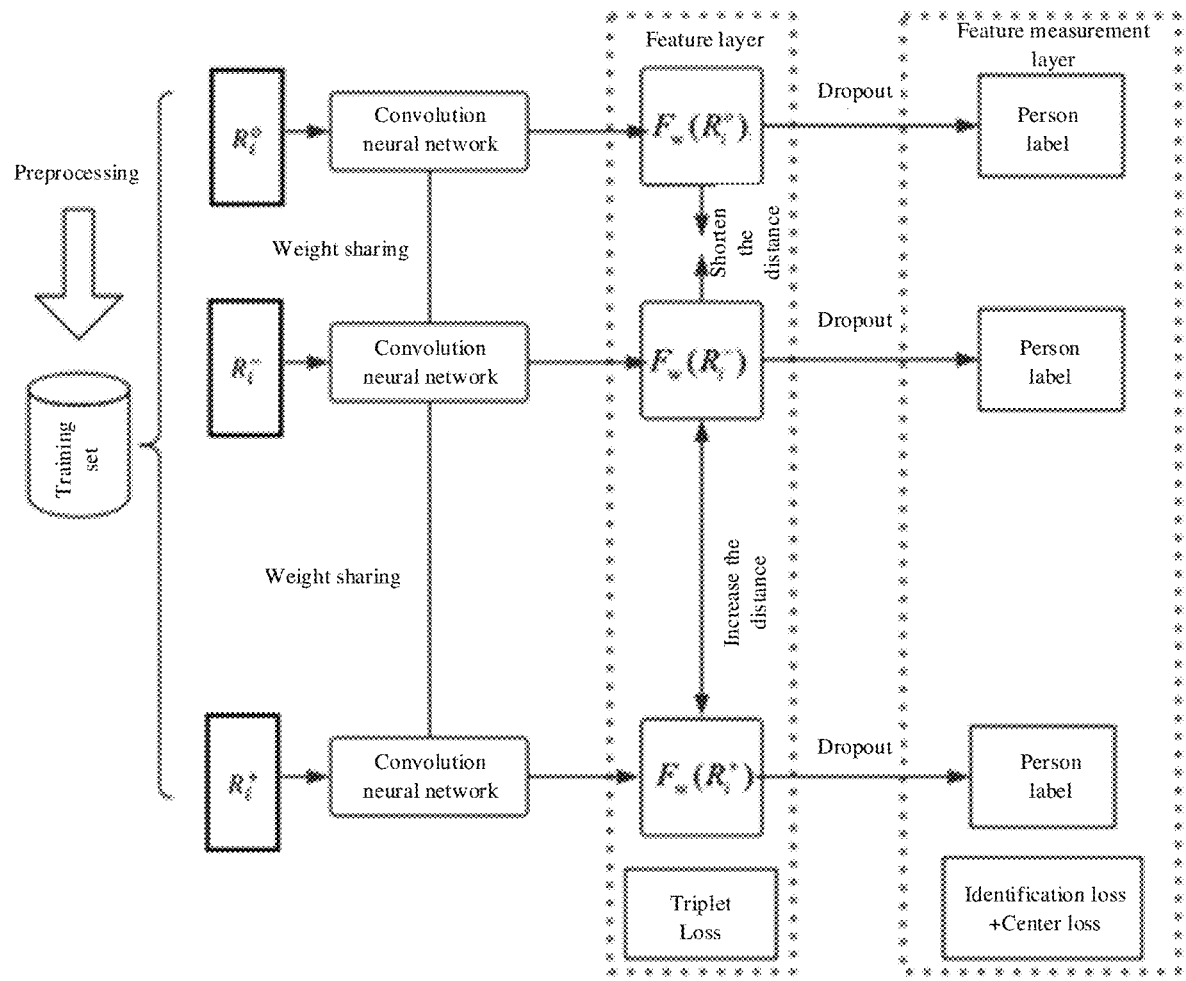
FIG. 1 is an overall network block diagram of a method according to the invention.
Figure 2:
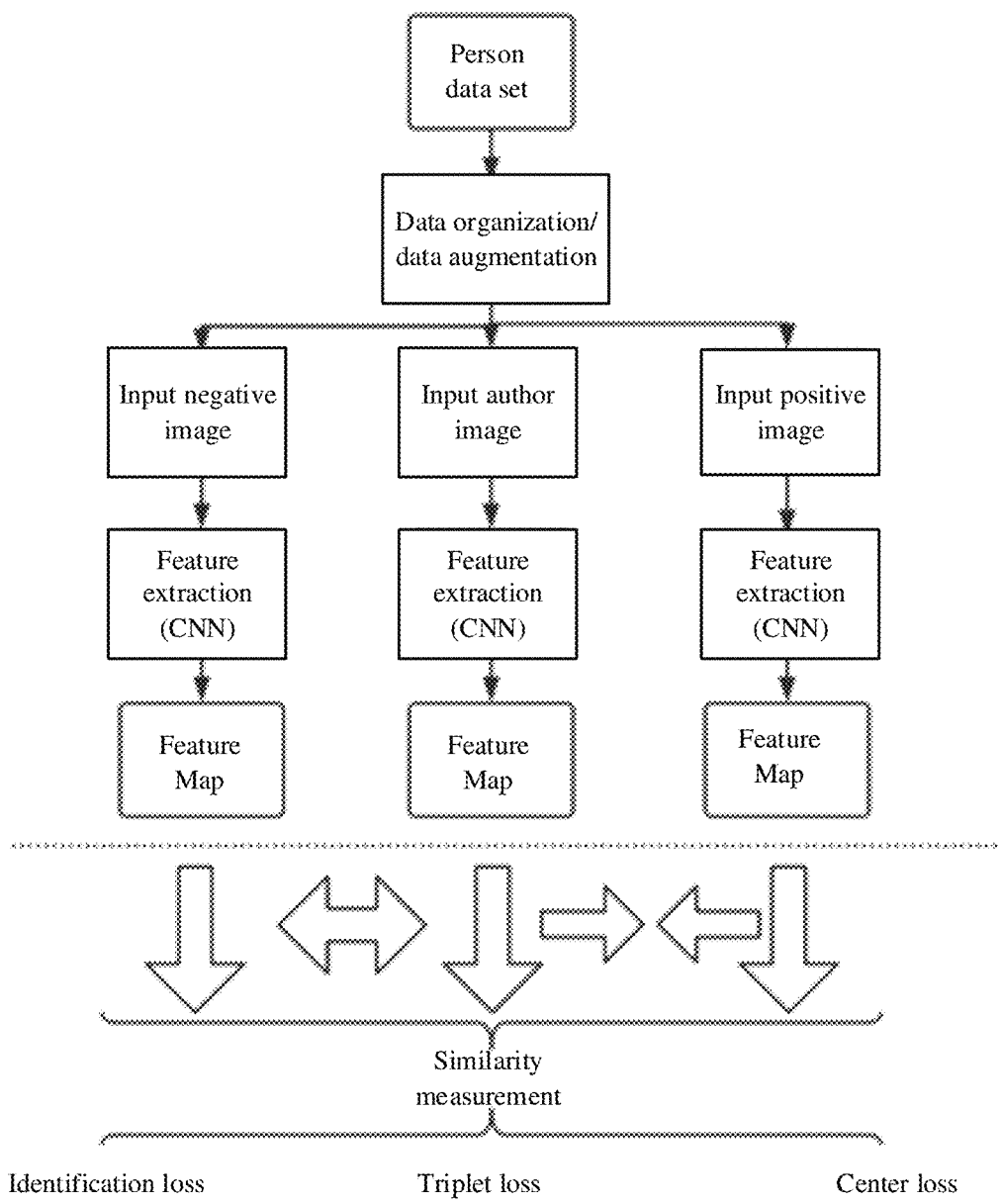
FIG. 2 is a schematic diagram of person re-identification network training process of the method according to the invention.
Figure 3:
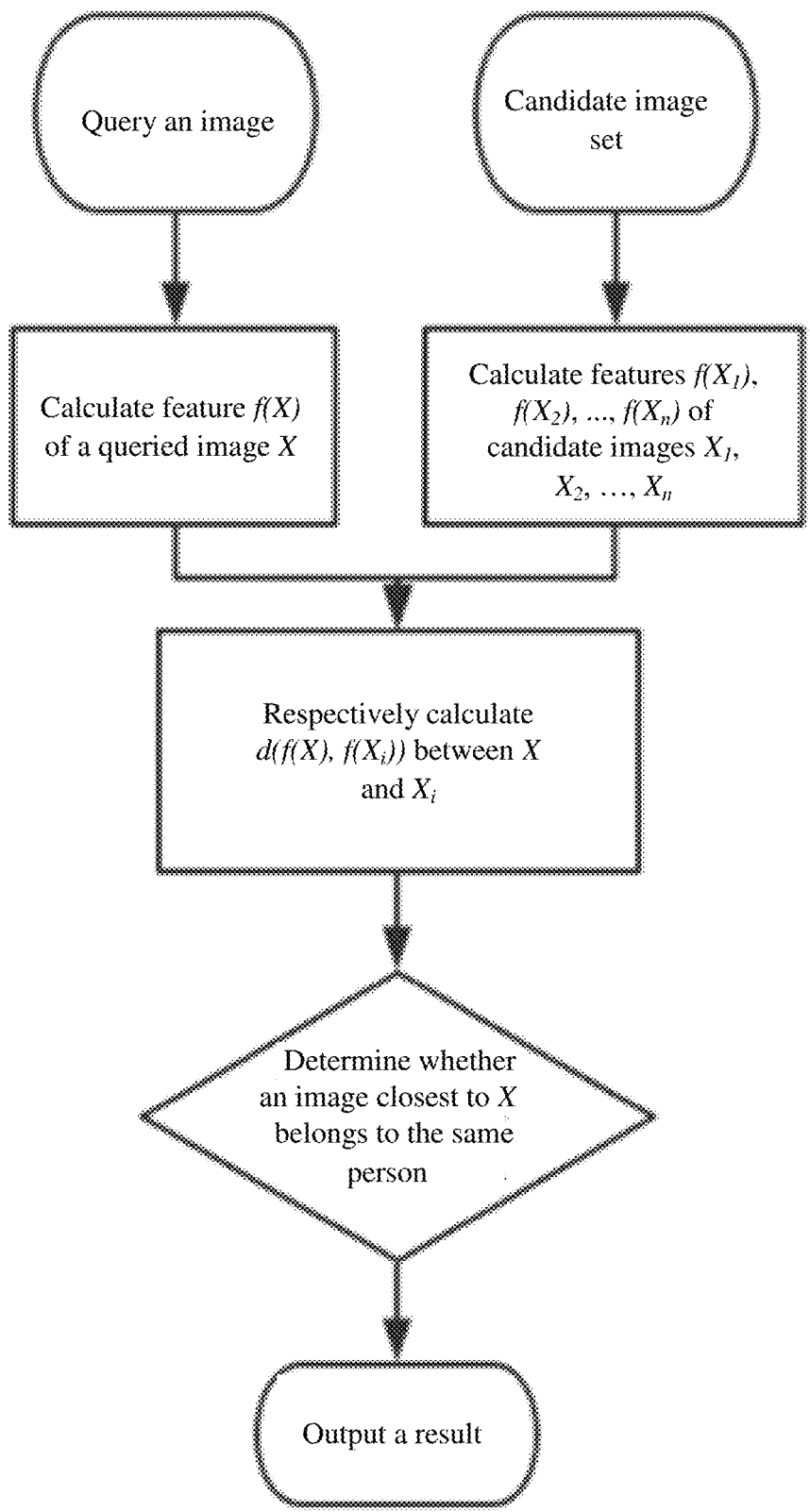
FIG. 3 is a schematic diagram of person re-identification network test process in the method of the invention.

The present invention is described in detail below with reference to the accompanying drawings and specific embodiments. Apparently, the described embodiments are merely some rather than all of the embodiments of the present invention. All other embodiments obtained by a person of ordinary skill in the art based on the embodiments of the disclosure without creative efforts shall fall within the protection scope of the disclosure.

The present invention relates to a method for person re-identification based on a deep model with multi-loss fusion training strategy, including the following steps:

Step 1: Acquiring an original image data set, and dividing the data set into a training set and a test set.

Step 2: Performing data preprocessing and data augmentation on a benchmark data set of training set. The embodiment of the present invention adopts the following data processing modes:

1) Randomly extracting a plurality of images in the benchmark data set for horizontal flipping.
2) Randomly extracting a plurality of images in the benchmark data set and performing Gaussian and salt-pepper noise processing.
3) Randomly extracting a plurality of images in the benchmark data set for erasing the random size of the random area.
4) Using Cycle GAN to perform style transfer of the same person taken by different cameras in the same data set, which reduces the environmental difference between different camera visions.

Step 3: Selecting and training the benchmark network, updating the weight, optimizing the model, and adjusting the hyper-parameters of the benchmark network. For the model training, a joint limit is performed by fusing an identification loss function, a center loss function and a triplet loss function.

Step 4: After the data set is subjected to the corresponding organization and the foregoing data augmentation, input the image into the CNN for feature extraction.

Step 5: Calculating the Euclidean distances for the extracted features in pairs, sorting the calculated Euclidean distances, and selecting from the gallery set an image closest to a target in the query set as an identification result.

This embodiment takes the data set Market1501 as an example to illustrate the training process and test process of the network model. It should be understood that the specific embodiments described herein are merely illustrative of the present invention, but the invention is not used to limit a single special data set.

Data Organization:

A total of 12936 images of 751 ID persons in the Market1501 data set are taken as training data, and the rest 19732 images are taken as test data. The test data is divided into the query set and the gallery set. The query set has 3368 images, including 750 person IDs. The remaining images of the test data are used as the gallery set.

Data Preprocessing:

randomly extracted several images from the training data for horizontal flipping, noise adding, random erasing. At the same time, for the 6 cameras in the Market1501 data set, the images between different cameras are subjected to perform a camera style transfer using cycle GAN, which makes the data set augmented in multiples.

Network Training:

Market1501 is a relatively large person re-identification dataset, the network pre-trained on ImageNet is used for extraction, Due to parameter and time considerations, ResNet50 is used as a backbone network, and dropout is used to prevent over-fitting. By using the Adam method, loss functions of fusion of the triplet loss, the identification loss and the center loss are continuously reduced to update the weight and optimize the network.

Network Evaluation:

The trained network is used for feature extraction in the query set and the gallery set, calculate the distance between the proposed features by calculating the Euclidean distance; an image close to a target in the query set is obtained in the gallery set to judge whether the persons obtained in the gallery set and the query set are the same person, and if so, the output resulted is used as the identification result.

Network Results:

Through evaluation and calculation, the method for person re-identification based on a deep model with multi-loss fusion training strategy is proposed. On the Market1501 data set (without re-ranking), mAP is 70.1, rank1 accuracy is 86.6, and rank5 accuracy is 94.6. At the same time, some better experimental results are also achieved on other data sets.

The foregoing descriptions are only specific implementations of the present invention, but the protection scope of the present invention is not limited thereto. Any person skilled in art can easily conceive of various equivalent modifications or replacements within the technical scope disclosed in the present invention, and these equivalent modifications or replacements should fall within the protection scope of the present invention. Therefore, the protection scope of the present invention should be subject to the protection scope of the claims.

The invention claimed is:

1. A method for person re-identification based on a deep model with multi-loss fusion training strategy, comprising the following steps:
    1): Acquiring an original image data set, dividing the original image data set into a training set and a test set, and dividing the test set into a query set and a gallery set;
    2): Sequentially subjecting image data of the training set to a data preprocessing process of flipping, noise adding, automatic clipping, random erasing and style transfer, and performing data augmentation after the preprocessing is completed;
    3): Selecting and training a benchmark network, updating the weight, optimizing the benchmark network, and adjusting a hyper-parameter; wherein, the benchmark network is trained by a fusion of triplet loss function, cross-entropy loss function and center loss function, wherein the triplet loss function is used to increase an inter-class distance and shorten an intra-class distance, and the center loss function is used to make feature maps of the same identity (ID) close to the center;
    4): Inputting the training set image data obtained in step 2) into the optimized and adjusted benchmark network for feature extraction; and
    5): Calculating Euclidean distances for the extracted features in pairs, sorting the calculated Euclidean distances, and selecting from the gallery set an image closest to a target in the query set as an identification result.

2. The method for person re-identification based on a deep model with multi-loss fusion training strategy according to claim 1, wherein in step 3), for a large number of person re-identification data set, the transfer learning method is adopted to initialize pre-trained model parameters, and then training is further performed; and for a person data set with a small amount of data, the model trained on the large data is used to fine-tune the training.

3. The method for person re-identification based on a deep model with multi-loss fusion training strategy according to claim 1, wherein a triplet model is used as a skeleton and three images are used as a group of inputs, and an expression of a group of input images is:

$$R_i = <R_i^o, R_i^+, R_i^o>$$

wherein $R_i^o$, $R_i^+$ and $R_i^-$ are expressions of the group of three images in the input, respectively, $R_i^o$ and $R_i^+$ are positive sample pairs, respectively, and $R_i^o$ and $R_i^-$ are negative sample pairs, respectively.

4. The method for person re-identification based on a deep model with multi-loss fusion training strategy according to claim 1, wherein an expression of the loss function L for fusion of the triplet loss function, the cross entropy loss function and the center loss function is:

$$L = \alpha_1 L_1 + \alpha_2 L_2 + \alpha_3 L_3$$

wherein $L_1$ is the cross-entropy loss function, $L_2$ is the triplet loss function, $L_3$ is the center loss function, $\alpha_1$ is the weight of a proportion of the cross-entropy loss, $\alpha_2$ is the weight of a proportion of the triplet loss, and $\alpha_3$ is the weight of a proportion of the center loss.

5. The method for person re-identification based on a deep model with multi-loss fusion training according to claim 4, wherein the expression of the cross-entropy loss function $L_1$ is:

$$L_1 = -\frac{1}{m}\sum_{i=1}^{m} \log \frac{e^{W_{y_i}^T x_i + b_{y_i}}}{\sum_{j=1}^{n} e^{W_j^T x_i + b_j}}$$

wherein i is the sample, $x_i$ is the feature class, m represents the sample batch size, n represents the number of person IDs, $b_j$ is the j-th offset value, $y_i$ is label information of an input i-th sample, $W_i$ is the i-th column of the parameter matrix W of the feature layer, and T represents a transpose of parameter matrix.

6. The method for person re-identification based on deep model with multi-loss fusion training strategy according to claim 5, wherein the corresponding expression of the triplet loss function $L_2$ is:

$$L_2 = [\text{thre} + d)(F_w(R_i^o), F_w(R_i^+)) - d(F_w(R_i^o), F_w(R_i^-))]_+$$

wherein thre is a hyper-parameter used to make a distance between sample pairs of the same class smaller than a distance between sample pairs of different classes, d(.) represents the distance measurement function, $F_w(R_i^o)$, $F_w(R_i^+)$ and $F_w(R_i^-)$ are feature maps corresponding to $R_i^o$, $R_i^+$ and $R_i^-$ respectively, and $[x]_+$ is a function max (0, x).

7. The method for person re-identification based on deep model with multi-loss fusion training strategy according to claim 6, wherein the corresponding expression of the center loss function $L_3$ is:

$$L_3 = \frac{1}{2m}\sum_{i=1}^{m} \|x_i - center_{y_i}\|_2^2$$

wherein $center_{y_i}$ is a center point of the feature with $x_i$ class being $y_i$.

8. The method for person re-identification based on deep model with multi-loss fusion training strategy according to claim 7, wherein the center of the center loss function $L_3$ is continuously updated in the training process, and the update formula is as follows when $s = y_i$:

$$\Delta center_s^t = \frac{\sum_{i=1}^{m} center_s - x_i}{m+1}$$

$$center_s^{t+1} = center_j^t - \lambda \cdot \Delta center_s^t$$

wherein $\lambda$ is a learning rate of the center loss function and $\Delta$ is an increment of a variable.

9. The method for person re-identification based on deep model with multi-loss fusion training strategy according to claim 1, wherein in Step 3), adjusting the hyper-parameters of the benchmark network comprises iteration step adjustment, initial value adjustment of iteration step, and selection of learning functions.

* * * * *